United States Patent
Brown (10) Patent No.: US 12,530,649 B2
(45) Date of Patent: Jan. 20, 2026

(54) COMPOSITIONAL CONSTRUCTION OF DIGITAL TWINS

(71) Applicant: Deixis, PBC, Seattle, WA (US)

(72) Inventor: Allen L. Brown, Valencia (ES)

(73) Assignee: Deixis, PBC, Jonesville, NC (US)

( * ) Notice: Subject to any disclaimer, the term of this patent is extended or adjusted under 35 U.S.C. 154(b) by 204 days.

(21) Appl. No.: 18/408,015

(22) Filed: Jan. 9, 2024

(65) Prior Publication Data

US 2024/0232781 A1    Jul. 11, 2024

Related U.S. Application Data

(60) Provisional application No. 63/437,905, filed on Jan. 9, 2023.

(51) Int. Cl.
*G06Q 10/067* (2023.01)

(52) U.S. Cl.
CPC .................... *G06Q 10/067* (2013.01)

(58) Field of Classification Search
None
See application file for complete search history.

(56) References Cited

U.S. PATENT DOCUMENTS

| | | | | |
|---|---|---|---|---|
| 11,693,628 B2 * | 7/2023 | Ritter | ........................ | G06F 8/20 717/104 |
| 2007/0208587 A1 * | 9/2007 | Sitaraman | .............. | G06Q 10/10 705/301 |
| 2013/0138575 A1 * | 5/2013 | Zabrovarnyy | .......... | G06F 8/355 705/348 |
| 2013/0138603 A1 * | 5/2013 | Chilakamarri | ......... | G06Q 10/00 707/E17.005 |
| 2014/0164298 A1 * | 6/2014 | Goranson | ................ | G06N 5/02 706/12 |
| 2018/0246738 A1 * | 8/2018 | Mccourtney | .............. | G06F 8/31 |
| 2019/0050213 A1 * | 2/2019 | Schanafelt | .............. | G06F 21/62 |
| 2021/0150056 A1 * | 5/2021 | Vax | ........................ | G06F 16/285 |
| 2023/0318815 A1 * | 10/2023 | Brown | .................. | H04L 9/0656 380/28 |

FOREIGN PATENT DOCUMENTS

JP    H06149555 A    *    5/1994

* cited by examiner

*Primary Examiner* — Philip Wang
(74) *Attorney, Agent, or Firm* — Powell IP Law, PLLC (57) ABSTRACT

Techniques to generate high fidelity digital twins are disclosed. A business process is specified with a received document, including a graphical diagram. The business process document is parsed, and a mathematical twin comprised of a categorical wiring diagram is generated using a monoidal category. A digital twin is then generated from the categorical wiring diagram by mapping the category into a type system overlaid on a programming language; a relational database schema generated from taking attributes passed in the wiring diagram and applying a normalizing algorithm, and a system to persist changes to the database using a projection protocol and a distributed ledger such as a blockchain. In some embodiments, accounting debit/credit semantics are selected for the relational database schema.

20 Claims, 4 Drawing Sheets

COMPOSITIONAL CONSTRUCTION OF DIGITAL TWINS

CROSS-REFERENCE TO RELATED APPLICATIONS

This patent application claims priority to U.S. Provisional Patent Application 63/437,905, entitled "Compositional Construction of Digital Twins," filed on Jan. 9, 2023, all of which is hereby incorporated by reference. U.S. Provisional Patent Application includes 63/437,905 copies of the papers "Considerations on Accounting as Chronicles of the Flows and Transformations of Assets", Dr. Allen L. Brown and "Compositional Construction of Digital Twins—Applications of Categorical Wiring Diagrams", also by Dr. Allen L. Brown both referenced below.

BACKGROUND OF THE INVENTION

Workflows and information flows are a common subject matter for enterprises. Workflows are often how business processes and indeed the underlying business model are expressed. For this reason, how a workflow is expressed is critical to an enterprise, in particular one would expect that workflow expressions have fidelity to the actual processes depicted, as to avoid errors in implementation and execution.

However, business processes are most commonly expressed in plain natural languages such as English. Such natural language descriptions may be supplemented with diagrams such as flow charts. In some circumstances, more formal expressions like Business Process Execution Language (BPEL) and formalized diagrams such as Unified Modeling Language (UML) are used in some specific contexts, such expressions do not sufficiently support formal mathematical methods, and thereby provide automated methods to check fidelity, veracity, and other desirable attributes of an expression of a business process or model.

Where these expressions are used to make automations and simulations of business processes using computers, for example in the notion of a "digital twin" core to digital transformation, the lack of formal mathematical methods becomes critical. Where an enterprise uses a digital twin to perform a simulation to predict future performance, the simulation is only as good as its fidelity. Accordingly, there is a need to formalize expressions of business processes in ways that lend themselves to formal methods of analysis and automation.

BRIEF DESCRIPTION OF DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION OF THE INVENTION

Context of Compositional Construction of Digital Twins
Business Processes and Digital Twins Enterprises are replete with business processes. Some processes are manufacturing processes, where the subject matter is physical. Other processes are financial, such as managing payroll. Yet other processes are technical, such as the software scheduling routines for high-speed cellular communications networks. And there are still more. However, enterprises have come to rely on the automation of business processes to the point that in some cases, business process automation has been designed "mission critical." Specifically, a failure in the automated business process would be expected to cause a loss that either created an unacceptable liability, or worse posed an existential threat to the enterprise.

Accordingly, enterprises wish to verify that any change in the physical business processes that they rely on will work as expected, and conversely enterprises with to verify that any automation systems for a business process faithfully models the attributes of interest to sufficient resolution (i.e., sufficient level of detail). Enter the notion of a digital twin.

A digital twin is a virtual representation of a subject in the physical world (including an object, person, or process) and relevant aspects of the environment in which the physical subject operates, in software in order enable simulations of attributes of the physical subject. In some embodiments, a digital twin may include a visual aspect. In other embodiments a digital twin may operate in real-time. The result is that a change in a business process, or a new business process can be tried out in the digital twin simulation first. Such proactive testing will reduce problems when the business process is rolled out into production. Accordingly, notwithstanding optional aspects such as real-time and visual representation, as stated above the aspect of digital twinning of interest in this document is the ability to faithfully simulate attributes of interest to sufficient resolution as to have confidence in converting the simulation to the physical world.

Faithful Representation and Resolution Through Mathematical Rigor

Focusing on the issue that digital twins should be faithful and have high resolution, the question is to ask how we would be able to verify this. We propose to use category theory, a branch of abstract algebra, to provide formal checks, i.e., use of rigorous mathematical techniques to provide the means of verification.

Figure 1:
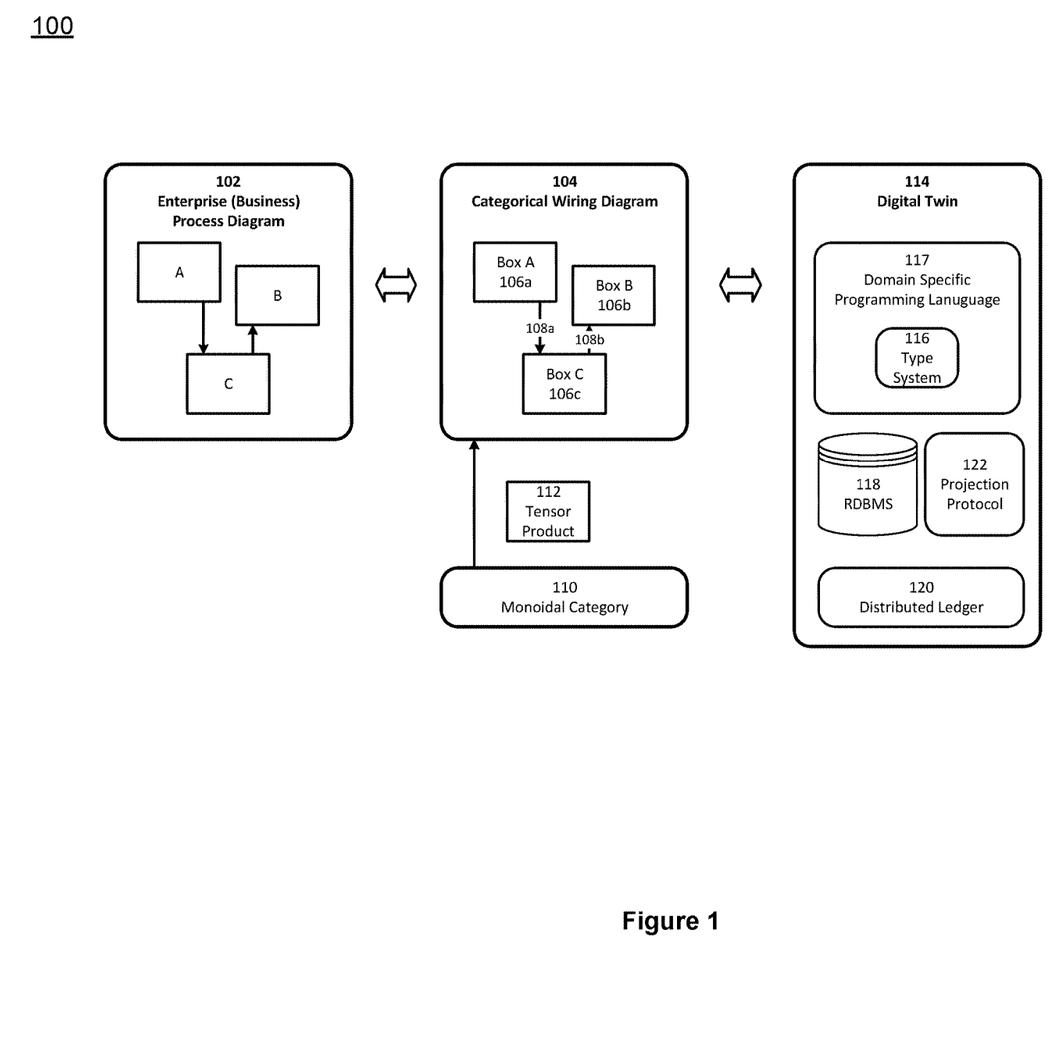
FIG. 1 is a context diagram for compositional construction of digital twins.

Accordingly, to formalize business processes we receive a business process, usually in the form a diagram, creating a corresponding mathematical model sometimes colloquially called a "mathematical twin," and then creating a software program from the mathematical twin called a digital twin. FIG. 1 is a context diagram 100 for compositional construction of digital twins.

We start with business process diagrams 102 found in typical business and technical documentation for business processes and convert these in software into mathematical representation in terms of category theory artifacts, specifically categories, functors, and natural transformations. This mathematical representation as will be seen below is a categorical wiring diagram 104. The mathematical representation then allows the use of process calculi techniques and ledger protocols such as Symmetric Asset Exchange (SAX) protocols to perform formal analysis.

One of the benefits of the use of category theory is that it can determine when mathematical composition can be guaranteed. This is relevant because complex business processes can be modeled in terms of "mixing and matching" of simpler business processes. Accordingly, it is desirable to enable the combination or analogous "mixing and matching"

of the digital twins of business processes. Specifically, an output of a process may be an input to another process, and a larger process may be mathematically made from multiple smaller processes. Accordingly, if processes can be represented in categorical models then there are techniques to combine the processes in a rigorous way (i.e., admitting the use of formal methods and analysis), the techniques known as "mathematical composition", or simply "composition."

One categorical representation is that of a "categorical wiring diagram" or "wiring diagram" for short 104. Specifically for a given enterprise process comprised of multiple subprocesses, inputs and outputs of the subprocesses are modeled as nodes called "boxes" 106a-c with inputs and outputs and where the connected inputs and outputs are modeled as connections called "wires" 108a-b representing communications channels. Wiring diagram 104 obeys specific mathematical rules. Those rules include the selection of a monoidal category 110 to interpret the categorical wiring diagram that is a mathematical category equipped with an identity and a tensor product 112 that is associative up to a natural isomorphism, along with coherence conditions guaranteeing its generated categorical diagrams commute.

In a wiring diagram, these rules in turn guarantee faithful representation of the subprocesses represented, including the composition of the subprocesses. A subprocess is interpreted as a morphism. Specifically, because a subprocess can be seen as a composition of smaller subprocesses, the subprocess can be modeled as a morphism composed of applications of the monoidal category's tensor product. Note that one of the reasons this is possible via the selection of a monoidal category is that monoidal categories support parallel composition.

Accordingly, the categorical wiring diagram is the faithful mathematical twin we seek. Note that any set of boxes in the wiring diagram connected by wires can be abstracted into a box itself. Accordingly, a wiring diagram can provide a view of the process at an arbitrary level of abstraction, where the abstraction simply represents the subset of connected subprocesses as a box. The ability to view at different levels of abstraction is called "semantic zoom."

Type Systems and Domain Specific Languages

We now convert the wiring diagram 104 into a software digital twin 114. A digital twin makes use of a data representation of the business process and performs software operations via a programming language. To do so, we will generate a domain specific programming language.

It is to be observed that every mathematical category can be turned into a type system. A type system corresponds to a collection of program data and program functions. Accordingly, we generate a type system 116 corresponding to the categorical wiring diagram 104. Where this type system 116 from the mathematical category is embedded in a programming language 118, that programming language becomes domain specific to the enterprise process. Specifically, operations can be represented by programs in this generated domain specific programming language 118.

Note that the use of process calculi, such as the pi calculus in the domain specific programming language enables formal analysis of the operation of programs. Accordingly, formal methods and automated checking may be brought to bear to programs in the domain specific programming language thereby enabling checks to be performed with mathematical rigor.

Persistence on Relational Databases and Distributed Ledgers

Turning to persistence of the digital twin 114, note that the values of the attributes corresponding to the wires 108a-b in the wiring diagram 104 are time series values. These time series values represent the state of the business process at a particular time. These time series values can be either in individual values, in quantales (an algebraic structure that is a residuated semigroup), in vectors, in semirings, or other algebraic structures.

Note that the morphisms in the wiring diagram 104 in some cases are finite valued. Where a morphism is a finite valued functor on the wiring diagram 104, the morphism can be persisted as a set of interconnected tables, where the time series values represent records. Accordingly, the morphism can be translated into a relational database.

Accordingly, programs written in domain specific programming language 117, where domain constraints are enforced via type system 116, may persist to relational database management system 118 with tables generated from morphisms as described above.

Where a business process is in categorical representation and use of a projection protocol 122 such as Symmetric Access Exchange (SAX) are brought to bear, persistence of operation can be provided not only via relational database 118 but also a distributed ledger 120 such as a blockchain.

Specifically, projection protocol 122 is a protocol that takes activity on a relational database 118, serializes the data, and the stores the data onto a distributed ledger 120. One example includes the process to generate transaction logs on a relational database.

Accessibility and Understandability of Results Through Accounting Semantics

While there are a large number of potential table representations to persist data in the digital twin 114, it is preferred to choose a table structure that supports semantics already understood by the business community. Accordingly, accounting semantics are selected. Note that this categorical representation can be converted into an accounting style ledger. Specifically, the choice of relational tables in the relational database 118 can be selected to support accounting double entry techniques. Accordingly, accounting ledger techniques, well understood by the business community, may be brought to bear.

The result is that use of these techniques enables one to represent business processes starting from process diagrams 102 into a mathematical twin (wiring diagrams) 104 and then to a digital twin 114. Because the mathematical twin is equipped with a monoidal category, it has a tensor product that guarantees representation of processes by composition. Because a type system 116 can be generated from the category, the digital twin can have a domain specific programming language 117 that enforces the constraints of the actual business process faithfully. The use of formal methods such as process calculi become available and therefore enable automation equipped with automation checks.

Furthermore, the representations are mapped to ledger formats that make use of debit/credit semantics also known as accounting techniques. As accounting techniques are well understood, they provide an abstraction with a ready set of end users, and furthermore provide a natural auditing mechanism to review progress through a business process, such as if represented in a relational database 118 and projected via a projection protocol 122 to a distributed ledger 120.

These techniques are automated in a Categorical Twin Modeling (CTM) system. The CTM system is described in further detail with respect to FIGS. 3 and 4 below.

These techniques are also described in further detail in, "Considerations on Accounting as Chronicles of the Flows and Transformations of Assets", Dr. Allen L. Brown and "Compositional Construction of Digital Twins—Applications of Categorical Wiring Diagrams", also by Dr. Allen L. Brown, both incorporated by reference herein as part of claiming priority to U.S. Provisional Patent No. 63/437,905, as set forth at the beginning of this document.

Exemplary Environment for Compositional Construction of Digital Twins

Figure 2:
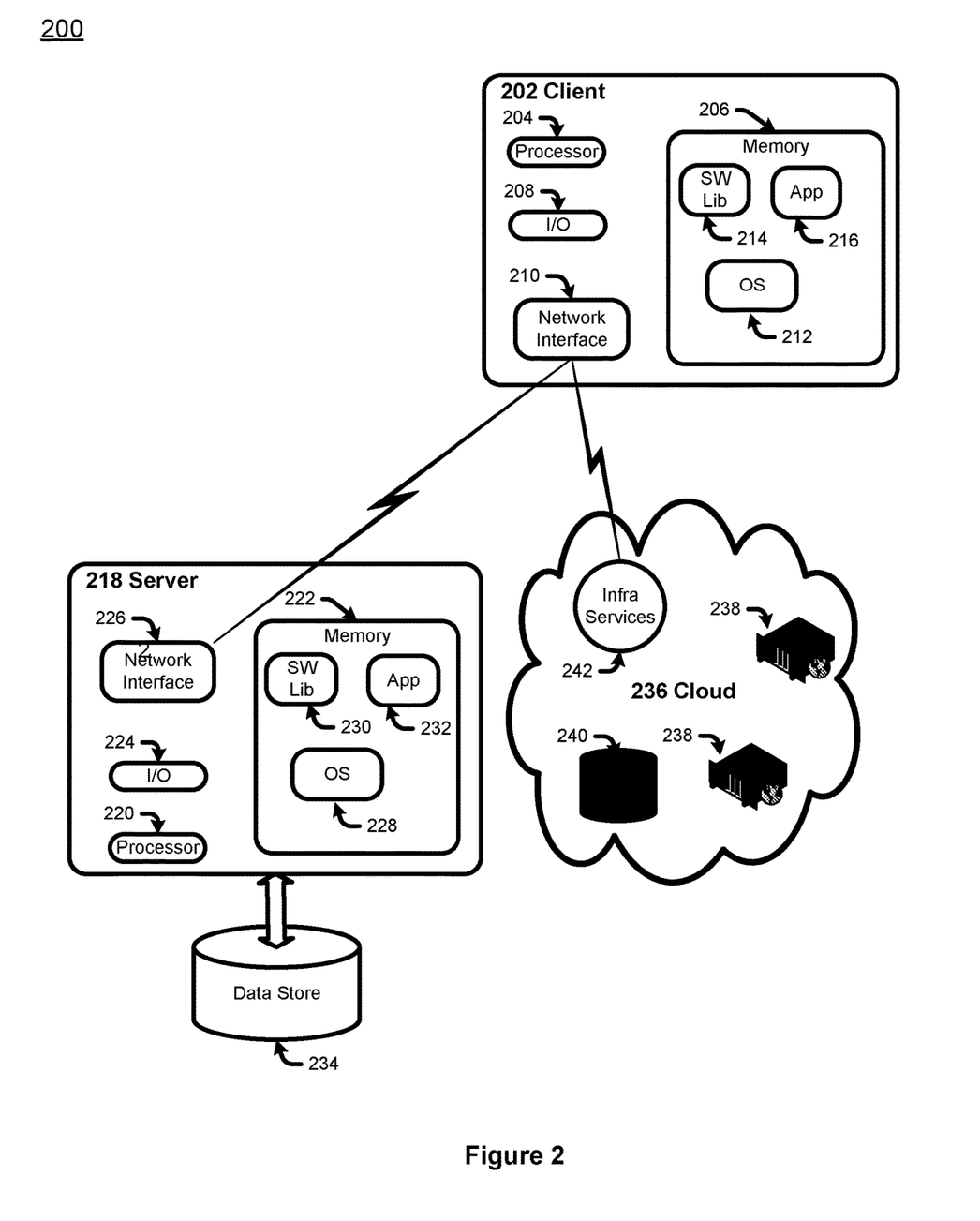
FIG. 2 is a diagram of an exemplary environment for compositional construction of digital twins.

This document discloses systems and methods for compositional construction of digital twins, primarily through a Categorical Twin Modeling (CTM) system. Before describing the CTM System, FIG. 2 shows in diagram 200 an exemplary hardware, software, and communications computing environment. Specifically, the functionality for the CTM System is generally hosted on a computing device. Exemplary computing devices include without limitation personal computers, laptops, embedded devices, tablet computers, smart phones, and virtual machines. In many cases, computing devices are to be networked.

One computing device may be a client computing device 202. The client computing device 202 may have a processor 204 and a memory 206. The processor may be a central processing unit, a repurposed graphical processing unit, and/or a dedicated controller such as a microcontroller. The client computing device 202 may further include an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210 may potentially work in concert with the I/O interface 208 and may be a network interface card supporting Ethernet and/or Wi-Fi and/or any number of other physical and/or datalink protocols.

Memory 206 is any computer-readable media which may store software components including an operating system 212, software libraries 214, and/or software applications 216. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

A server 218 is any computing device that may participate in a network. The network may be, without limitation, a local area network ("LAN"), a virtual private network ("VPN"), a cellular network, or the Internet. The server 218 is similar to the host computer for the image capture function. Specifically, it will include a processor 220, a memory 222, an input/output interface 224, and/or a network interface 226. In the memory will be an operating system 228, software libraries 230, and server-side applications 232. Server-side applications include file servers and databases including relational databases. Accordingly, server 218 may have a data store 234 comprising one or more hard drives or other persistent storage devices.

A service on cloud 236 may provide the services of server 218. In general, servers may either be a physical, dedicated server, or may be embodied in a virtual machine. In the latter case, cloud 236 may represent a plurality of disaggregated servers which provide virtual application server 238 functionality and virtual storage/database 240 functionality. The disaggregated servers are physical computer servers, which may have a processor, a memory, and an I/O interface and/or a network interface. The features and variations of the processor, the memory, the I/O interface and the network interface are substantially similar to those described for server 218. Differences may be where the disaggregated servers are optimized for throughput and/or for disaggregation.

Cloud 236 services 238 and 240 may be made accessible via an integrated cloud infrastructure 242. Cloud infrastructure 242 not only provides access to cloud services 238 and 240 but also to billing services and other monetization services. Cloud infrastructure 242 may provide additional service abstractions such as Platform as a Service ("PAAS"), Infrastructure as a Service ("IAAS"), and Software as a Service ("SAAS").

As previously stated, the difference between a physical server 218 or plurality of physical servers 218 arranged into a server farm is that the service provider 242 makes use of one or more hypervisors 244 to disaggregate the physical servers 218. Specifically, a hypervisor 244 tracks what physical server 218 services (including but not limited to compute, storage, input/output/network, and analytics such as via graphical processing units) are utilized and which are free. The hypervisor 244 acts like a scheduler for these services. When a hypervisor 244 receives a request for a virtual machine with a particular configuration, the hypervisor 244 selects services from the various physical servers 218 and creates a virtual machine 246 whose underlying hardware is from the selected services.

The instantiated virtual machine 246 is a software emulator that runs a selected computing instruction set architecture (ISA) such as x86, x64, or RISC-V. The hypervisor 244 configures the virtual machine 246 with an operating system of choice, provisions it with accounts of the requestor, and may install applications as desired. Typical applications include but are not limited to application servers 238 and database servers 240. The effect is that a requester only pays for requested computing services and can thereby both control (right-size) and outsource information technology (IT) services.

Because provisioning and booting an operating system on the virtual machine 246 takes time, computer requests on the virtual machine 246 are delayed by that provisioning and boot time. However, in some cases, a request desires an on demand, near real-time response. In the past, virtual machines 246 have been pre-instantiated in a pool. However, this assumes that the pre-instantiated virtual machines have substantially the same functionality as a request. This is usually not the case.

Accordingly, containers 248, which are on-demand partitions of an already instantiated virtual machine 246, may be served to respond to a compute request. As its name implies, a container 248 is a subset of functionality of an instantiated virtual machine 246 where the container 248 is instantiated according to the compute request. Because all container 248 computing resources are already instantiated in the pre-instantiated virtual machine 246, there is no provisioning or boot time lag. Because only the requested computing resources in the container are served to the requestor, the requestor only pays for the requested computing resources, not for the entire virtual machine 246. The result is that requestors can get right-sized computing resources on demand in near real time. This is the premise of elastic computing.

An Exemplary CWT System

Figure 3:
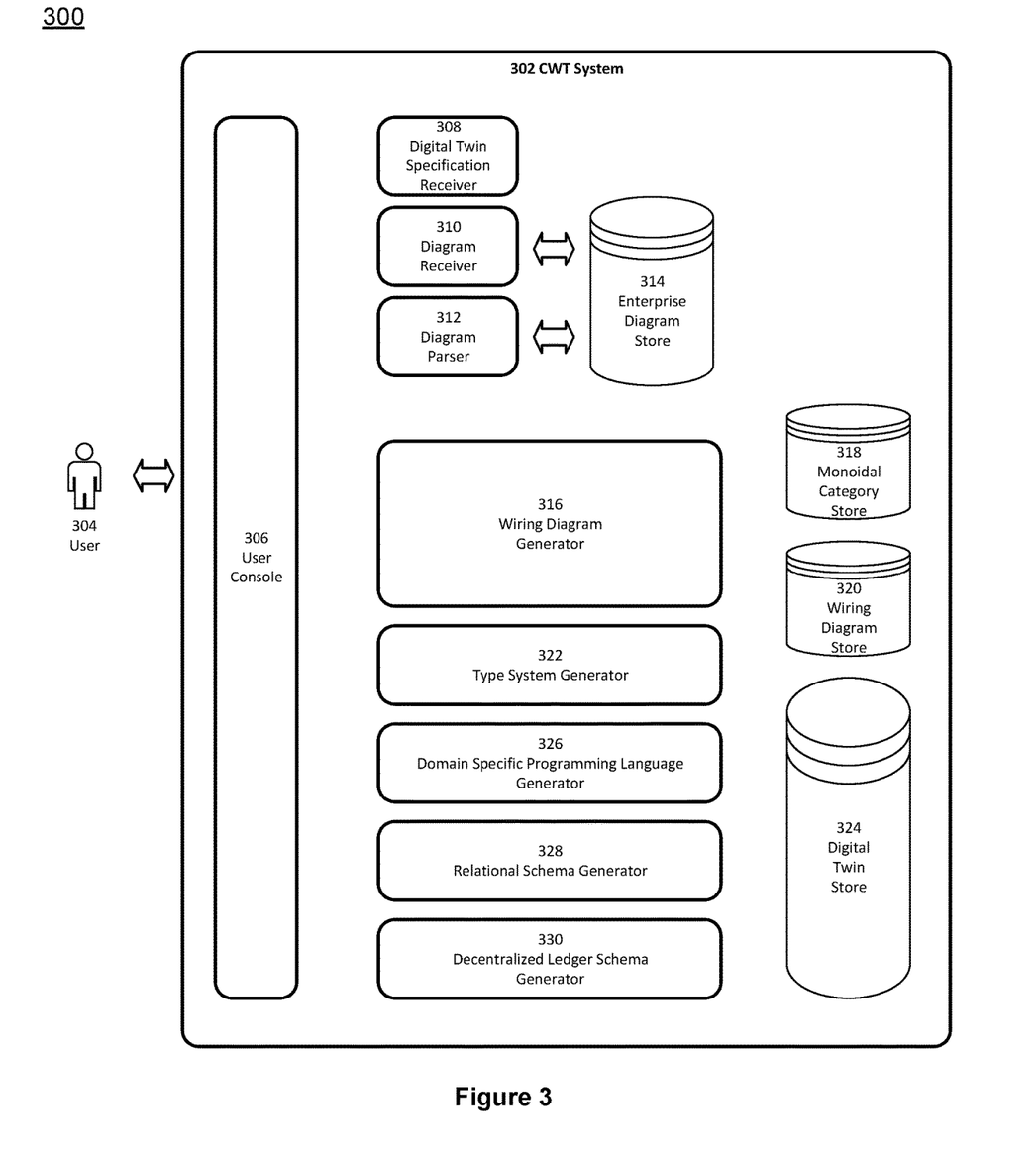
FIG. 3 is a diagram of an exemplary Categorical Twin Modeling (CTM) system.

Turning to FIG. 3, we describe a Categorical Twin Modeling (CTM) system itself in block diagram 300.

The CTM system 302 can be a desktop application, or a web application, potentially implemented as a Software as a Service system on the cloud. A system user, 302, interfaces with the CTM system 302 via the user console 306, a software component with a user interface. Inputs are generally a digital twin specification received generally as text via a digital twin specification receiver software component 308 and a diagram of a business process to be converted into a digital twin via a diagram receiver software component 310.

The digital twin specification includes attributes for the desired digital twin, such as type of persistence (relational database, distributed ledger, or both), naming of files and tables, whether to use accounting ledger protocols, and desired attributes of the selected monoidal category. The digital twin specification may be in text and may be formatted in XML or JSON or similar formatting language.

Upon receiving, the digital twin specification and the diagram receiver, the received diagram, and optionally the digital twin specification are stored in an enterprise diagram store 314. Enterprise diagram store 314 may be a file server or may be a database store such as a relational data store.

A diagram parser software component 312 then deconstructs the business process diagram into its constituents by identifying processes and communications channels within the diagram. Generally, nodes are expected to be processes and connections between processes are expected to be communications channels. In some embodiments, user 304 will provide hints to the parser 312 via the digital twin specification as to which nodes and connections are process parts. In other embodiments, artificial intelligence techniques, including large language models (LLMs) can be used to identify the processes and communications connections.

Note that alternatively to receiving a business process diagram, a more formal specification of the business process to be digitally twinned may be received. Formal specifications of business processes include descriptions written in Business Process Execution Language (BPEL) or equivalents.

Upon the parser 312 deconstructing the received business process diagram a wiring diagram generator software component 316 will make use of information from the digital twin specification and the deconstructed business process diagram and select a category from monoidal category store 318. In some cases, a user 304 may opt for a category with more structure or less structure than a monoid. For example, use of semirings and semigroups may be brought to bear.

The wiring diagram generator 316 then maps processes and subprocesses to boxes 106*a-c* in a wiring diagram and communications channels into wires 108*a-b* between the boxes. The selected monoidal category 110 is used to perform checks on the generated boxes and wires to ensure commutativity and therefore compositionality. The wiring diagram generator 316 validates the generated wiring diagram in a process described in further detail with respect to FIG. 4 below. The validated wiring diagram is stored in wiring diagram store 320.

At this point, we have a wiring diagram that has been validated and can be trusted to be the mathematical twin for a generated digital twin.

As categories can be used to generate type systems 116, the selected monoidal category 110 is used by type system generator software component 322 to generate a corresponding type system. A domain specific programming language generator software component 326 generates a domain specific programming language 117 that takes a base scripting language and overlays the newly generated type system 116. This may be accomplished by having an extendable base scripting language that allows the addition of new types and potentially new objects and implementing the new type system as new objects. Alternatively, this may be accomplished by having a base scripting language that supports the definition of constraints as set forth in the generated type system 116. An example of such a base language would be the Agda automated proof checking assistant where constraints are encoded as pre-proof and post-proof conditions. In some embodiments, new object type names may be taken from names of boxes and wires from the deconstructed business process diagram.

As previously stated, a set of connected boxes in a wiring diagram constitutes a candidate set of tables. Based on information in the received digital twin specification, a relational schema generator software component 328 generates a relational database schema 118. The process to generate the relational database schema 118 is described in further detail with respect to FIG. 4.

User 304 may have specified in the digital twin specification to make use of a decentralized ledger 120. In doing so, a projection protocol 122, such as symmetric exchange may be specified as well as attributes of interest. A decentralized ledger schema generator 330 will then receive attributes of interest to track. Upon each change of a field in the relational database 118 corresponding to an attribute of interest, perhaps implemented as a relational database trigger, the change is posted via the projection protocol 122 to a decentralized ledger 120 such as a blockchain. In the alternative, a batch process queries the transaction log of the relational database 118 for the attributes of interest, and then posts to the decentralized ledger 120.

Generation of a Digital Twin from an Enterprise Business Process Diagram

Figure 4:
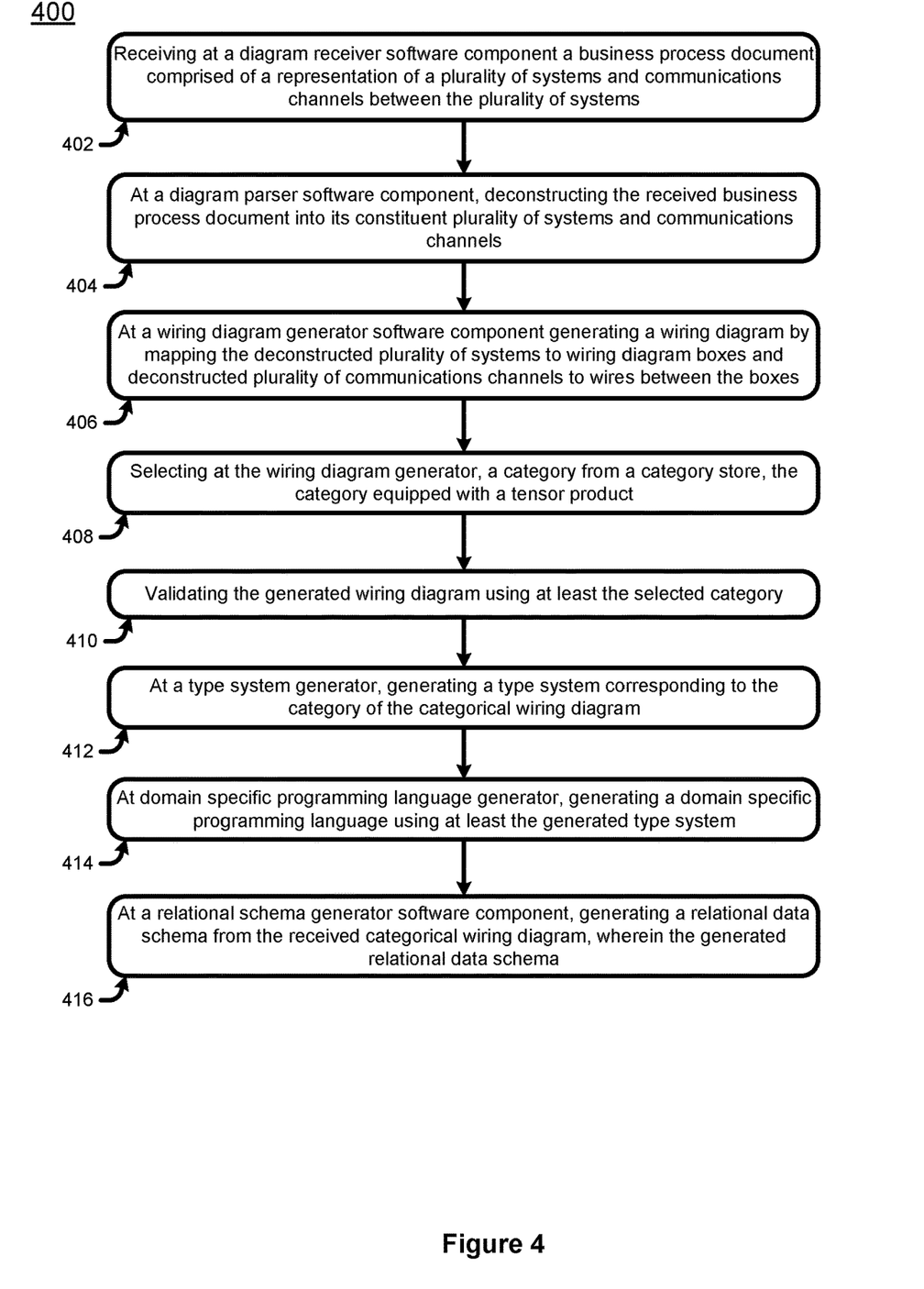
FIG. 4 is a flow chart for generating a digital twin from an enterprise/business process diagram.

Having described a CWT system, we turn to FIG. 4, a flow chart 400 of the generation of a digital twin from an enterprise business process diagram.

In block 402, diagram receiver software component 310 receives a business process diagram and a digital twin specification. The business process diagram may be a graphical representation of the business process or alternatively may be a formal representation such as BPEL as described above. Then a diagram parser software component 312, in block 404, deconstructs the received business process document into its constituent systems and communications channels.

A wiring diagram generator software component 316 then creates a candidate wiring diagram and then validates the candidate wiring diagram. In block 406 a candidate wiring diagram is first created by mapping the individually identified systems into wiring diagram boxes. The wiring diagram boxes are then connected via the identified communications channels.

Each of the communications channels involves the passing of at least one value. In a process called "enrichment," the quantities in the business process document are then attributed to the values corresponding to the wires in the wiring diagram. In this way, passed values as indicated in the business process document are represented in the candidate wiring diagram.

The candidate wiring diagram is then to be validated before becoming a final mathematical twin. The validation process involves the use of mathematical structure in a selected monoidal category. In block 408, the wiring diagram generator selects a monoidal category.

Recall that monoidal categories are equipped with a tensor product. In block 410, the candidate wiring category is validated using the tensor product.

In one embodiment of the validation process, each individual box in the candidate wiring diagram is identified. A morphism is identified as each pair of connected boxes and then checked for conformance with the selected monoidal category (ensuring that the morphisms are composites of the category's tensor product and that the generated categorical commutative diagrams in fact commute). Then each triple of connected boxes is checked for conformance, and so on with increasing numbers of connected boxes, until the final fully connected system is checked. Upon successful checking of all permutations of connected boxes, the generated wiring diagram is validated.

With the generated wiring diagram, the digital twin may now be generated. The digital twin may comprise a domain specific programming language 117, a relational data store with a relational schema 118, and optionally a distributed ledger 120.

Note that in abstract algebra, it is true that a type system can be generated from any category. Accordingly, to create the domain specific programming language 117, in block 412, a type system is generated from the selected monoidal category.

A relational schema 118, is comprised of definitions at least of tables and stored procedures. Potentially, definitions of triggers, views, and other relational database artifacts may be specified. A relational schema may be represented as a structured query language (SQL) document.

In block 416 the relational schema 118 is generated. In some embodiments, the relational schema generator 328 receives attributes of interest from the digital twin specification. The lowest level boxes that interact with those attributes are then selected by the relational schema generator 328. The attributes are then stored as fields in a single initial table. The initial table is then subjected to a normalization algorithm where fields with one-to-many cardinalities are separated into separate tables, and then index fields applied. Upon the creation of separate tables, each box is then turned into a stored procedure. The definitions of the normalized tables and the stored procedures constitute the generated relational schema. The definitions of the normalized tables and stored procedures may be persisted via a structured query language (SQL) script.

In some embodiments, the relational schema 118 may include triggers for posting to distributed ledgers. As stated above, a decentralized ledger schema generator 330 receives attributes of interest. The attributes of interest are collected and define a record type to be posted to the decentralized ledger 120. The relational schema generator 328 creates trigger definitions which upon detecting a change of a field in the relational database 118 corresponding to an attribute of interest post posted via the projection protocol 122 to a decentralized ledger 120. The posting includes at least a date/time stamp and the defined record type. In this way changes to the attributes of interest can be posted as time series data both in the relational database 118 and the decentralized ledger 120.

In this way, a user 304 may make use of the CWT system 302 to create a digital twin 114 that may include a domain specific programming language 117 with a type system 116, a relational database 118, and optionally a decentralized ledger schema 120 accessed via projection protocol 122.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method to generate a categorical wiring diagram mathematical twin of a business process, comprising:
   receiving at a diagram receiver software component a business process document comprised of a representation of a plurality of systems and communications channels between the plurality of systems;
   at a diagram parser software component, deconstructing the received business process document into its constituent plurality of systems and communications channels;
   at a wiring diagram generator software component generating a wiring diagram by mapping the deconstructed plurality of systems to wiring diagram boxes and deconstructed plurality of communications channels to wires between the boxes;
   selecting at the wiring diagram generator, a category from a category store, the category equipped with a tensor product; and
   validating the generated wiring diagram using at least the selected category.

2. The method of claim 1, wherein the received business process document is a graphical representation of the business process.

3. The method of claim 1, wherein the received business process document is a formal representation of the business process in business process execution language (BPEL) or equivalent.

4. The method of claim 1, wherein the selected category is a monoidal category.

5. The method of claim 1, wherein the selected category is either a quantale or a semiring.

6. The method of claim 1, wherein the validation of the wiring diagram comprises:
   identifying the constituent boxes in the wiring diagram;
   identifying each permutation of the constituent boxes where the constituent boxes are connected with at least one wire; and
   confirming that each identified permutation is a composition of the category tensor product.

7. The method of claim 6, wherein the validation of the wiring diagram comprises verifying that a categorical commutative diagram from each identified permutation commutes.

8. The method of claim 7, comprising:
selecting boxes in the wiring diagram connected with wires, and graphically representing the selected boxes as a single box; and
selecting a single box in the wiring diagram and graphically representing the selected single box into boxes and wires indicating subsystems;
wherein the graphical representations are based on the wiring diagram having been verified against the tensor product of the category, thereby implementing semantic zoom.

9. A system to generate a software digital twin business process from a categorical wiring diagram mathematical twin of the business process, comprising:
a processor capable of executing computer executable instructions; and
a memory capable of to store computer executable instructions and computer readable data configured to:
receive at a type system generator software component, a categorical wiring diagram from a wiring diagram store configured to store categorical wiring diagrams corresponding to business processes, each business process comprised of a set of boxes representing constituent subprocesses of the business process and wires between the boxes representing constituent communications channels between the subprocesses, the categorical wiring diagram equipped with a monoidal category having a tensor product;
at the type system generator, generate a type system corresponding to the monoidal category of the categorical wiring diagram; and
at a domain specific programming language generator, generate a domain specific programming language using at least the generated type system.

10. The system of claim 9, wherein the generating a domain specific programming language comprises:
receiving a base language supporting new object types and type checking of the new object types; and
adding new objects corresponding to types in the generated type system.

11. The system of claim 9, wherein the received base language can be modeled using process calculi, and compile time checks, run time checks, or both, make use of formal method proofs using process calculi.

12. The system of claim 9, wherein the generating a domain specific programming language further comprises:
receiving a base language supporting automated proof checking; and
adding new proof checking constraints corresponding to types in the generated type system.

13. The system of claim 9, comprising: at a relational schema generator software component, generating a relational data schema from the received categorical wiring diagram.

14. The system of claim 13, wherein the generating a relational database schema includes the generation of relational tables, and comprises:
receiving a set of attributes of interest;
combining the attributes of interest into a single initial relational database table;
applying a normalizing algorithm to subdivide the initial relational database table into multiple normalized tables along one-to-many or zero-to many cardinalities; and
applying indexes to the multiple normalized tables.

15. The system of claim 14, wherein the generating a relational database schema includes the generation of stored procedures, comprising:
identifying boxes and channels in the wiring diagram that touch at least one attribute in the received set of attributes of interest; and
for each box, identifying the corresponding morphism on the values of the channels and generating a stored procedure corresponding to the morphism.

16. The system of claim 15, comprising:
at a decentralized ledger schema receiving a set of attributes of interest;
at a decentralized ledger schema receiving a projection protocol;
specifying a record type in the decentralized ledger based at least on the received set of attributes of interest; and
specifying a program to store the specified record type in the decentralized ledger based at least on the received projection protocol.

17. The system of claim 16, comprising:
for at least one attribute of interest, generating a database trigger to post a change in the respective attribute of interest to the decentralized ledger using the specified record type.

18. The system of claim 17, wherein generating a relational database schema includes the generation of a structured query language (SQL) script encoding the table, stored procedures, and triggers.

19. A system to generate a software digital twin business process from a categorical wiring diagram mathematical twin of the business process, comprising:
a processor capable of executing computer executable instructions; and
a memory capable of to store computer executable instructions and computer readable data configured to:
receive at a type system generator software component, a categorical wiring diagram from a wiring diagram store configured to store categorical wiring diagrams corresponding to business processes, each business process comprised of a set of boxes representing constituent subprocesses of the business process and wires between the boxes representing constituent communications channels between the subprocesses, the categorical wiring diagram equipped with a category having a tensor product;
at the type system generator, generate a type system corresponding to the category of the categorical wiring diagram;
at a domain specific programming language generator, generate a domain specific programming language using at least the generated type system; and
at a relational schema generator software component, generate a relational data schema from the received categorical wiring diagram, wherein the generated relational data schema supports accounting debit/credit semantics.

20. The system of claim 19 wherein the category is either a quantale or a semiring.

* * * * *